(12) United States Patent  
Snowberger

(10) Patent No.: US 10,815,010 B2
(45) Date of Patent: Oct. 27, 2020

(54) HIGH ALTITUDE AIR LAUNCHED ROCKET

(71) Applicant: Kyle Snowberger, Chambersburg, PA (US)

(72) Inventor: Kyle Snowberger, Chambersburg, PA (US)

(73) Assignee: Intercept Nexus, LLC, Wilmington, DE (US)

( * ) Notice: Subject to any disclaimer, the term of this patent is extended or adjusted under 35 U.S.C. 154(b) by 544 days.

(21) Appl. No.: 15/855,202

(22) Filed: Dec. 27, 2017

(65) Prior Publication Data
US 2019/0193873 A1  Jun. 27, 2019

(51) Int. Cl.
*B64G 1/00* (2006.01)
*B64G 1/40* (2006.01)
*B64G 1/14* (2006.01)
*B64C 39/04* (2006.01)
*B64C 39/08* (2006.01)
*B64D 27/18* (2006.01)
*B64D 5/00* (2006.01)

(52) U.S. Cl.
CPC .............. *B64G 1/005* (2013.01); *B64C 39/04* (2013.01); *B64C 39/08* (2013.01); *B64D 5/00* (2013.01); *B64D 27/18* (2013.01); *B64G 1/14* (2013.01); *B64G 1/401* (2013.01); *B64G 1/402* (2013.01)

(58) Field of Classification Search
CPC ........ B64G 1/005; B64G 1/402; B64G 1/401; B64G 1/14; B64G 1/62; B64D 27/18; B64D 5/00; B64C 39/04; B64C 39/08
See application file for complete search history.

(56) References Cited

U.S. PATENT DOCUMENTS

| 3,065,937 | A | 11/1962 | Vigil |
| 3,204,892 | A | 9/1965 | Powell |
| 3,269,673 | A | 8/1966 | Reiniger |
| 3,576,298 | A | 4/1971 | Barnett |
| 3,952,971 | A | 4/1976 | Whitcomb |
| 4,901,949 | A | 2/1990 | Elias |
| 5,088,663 | A | 2/1992 | Henson |
| 5,255,873 | A | 10/1993 | Nelson |
| 5,740,985 | A | 4/1998 | Scott et al. |
| 6,948,682 | B1 | 9/2005 | Stephenson et al. |
| 7,594,624 | B2 | 9/2009 | Yamamoto |
| 8,056,852 | B1 * | 11/2011 | Dizdarevic ............ B64D 27/16 244/36 |
| 8,403,254 | B2 | 3/2013 | Ustinov |
| 8,528,853 | B2 | 9/2013 | Luther |
| 8,534,598 | B2 | 9/2013 | Salkeld |
| 8,925,857 | B2 | 1/2015 | Luther |
| 8,955,791 | B2 | 2/2015 | Smith et al. |

(Continued)

FOREIGN PATENT DOCUMENTS

EP  0304590  3/1989

*Primary Examiner* — Valentina Xavier
(74) *Attorney, Agent, or Firm* — Ballard Spahr LLP

(57) ABSTRACT

An air launched rocket for placing payloads in earth orbit comprising a lifting body having a cross sectional shape of an airfoil extending in a spanwise direction between a first and a second wing tip. The lifting body further comprises at least one rocket engine positioned at the first wing tip oriented for propelling the lifting body in the spanwise direction. The air launched rocket is combined with a carrier aircraft which is removably attached to a suction surface of the airfoil.

58 Claims, 14 Drawing Sheets

(56) References Cited

U.S. PATENT DOCUMENTS

| | | |
|---|---|---|
| 9,139,311 B2 | 9/2015 | Salkeld |
| 10,640,212 B1* | 5/2020 | Dizdarevic ............. B64C 39/08 |
| 2003/0080241 A1 | 5/2003 | Shpigler et al. |
| 2006/0208136 A1 | 9/2006 | Cook |
| 2009/0108135 A1 | 4/2009 | Shaw |
| 2010/0314498 A1 | 12/2010 | Im |
| 2015/0210407 A1* | 7/2015 | Griffin ...................... B64B 1/12 |
| | | 244/158.3 |
| 2017/0129626 A1 | 5/2017 | Bryan |
| 2017/0267380 A1 | 9/2017 | Featherstone et al. |
| 2018/0297712 A1* | 10/2018 | Oldroyd ................. B64C 39/08 |
| 2020/0148345 A1* | 5/2020 | Wittmaak, Jr. ....... B64C 39/024 |

* cited by examiner

HIGH ALTITUDE AIR LAUNCHED ROCKET

FIELD OF THE INVENTION

This invention relates to air launched rockets for placing payloads in earth orbit.

BACKGROUND

Air launched rockets, mounted on the underside of wings or the fuselage of a carrier aircraft, have been used to place payloads in orbit or suborbital altitudes. The air launched rockets are flown to altitude for drop launch. Once dropped the rocket, traveling in the direction of the carrier aircraft, at a safe distance, ignites the rocket engine and maneuvers to orbit. The prior art air launched rockets, such as the Pegasus, are designed to aerodynamically resemble missiles or fuel tanks stored on the wings or fuselages of aircraft. They are oriented along the carrier aircraft flight direction with a minimum cross section to minimize drag during the flight phase. This cross section minimization limits the size of the air launched rocket and the payload. In addition, because the existing air launched rockets deploy from altitudes of about 40,000 feet, they require aerodynamic and control surfaces which add weight to the air launched rocket. These surfaces are typically jettisoned after the rocket ignition at an altitude where the aerodynamic forces are negligible. Relative to rocket engine performance the engine nozzle design is influenced by atmospheric pressure induced thrust reduction at design altitudes. There is an opportunity to improve the performance of air launched rockets and allow for larger payloads to be placed into orbit

SUMMARY

The invention concerns an air launched rocket. An example air launched rocket comprises a lifting body having a cross sectional shape of an airfoil extending in a spanwise direction between a first and a second wing tip, and at least one rocket engine positioned at the first wing tip. In this example the rocket engine is oriented for propelling the lifting body in a spanwise direction. In one embodiment the air launched rocket has at least one rocket engine that is liquid fueled. In a particular embodiment the rocket engine further comprises at least one fuel tank, at least one oxidizer tank and a cargo bay. In this example the fuel tank, oxidizer tank and the cargo bay are positioned within the lifting body. In one example the air launched rocket cargo bay is positioned at a quarter chord point of said airfoil. In another example the cargo bay extends in a spanwise direction within the lifting body. By way of example, at least one fuel tank is positioned along a trailing edge of the airfoil. In another example, at least one oxidizer tank is positioned along a leading edge of said airfoil. This example further comprises a first fairing covering the first wing tip. In this example the first fairing is jettisonable during flight. This example further comprises a second fairing covering the second wing tip. In this example the second fairing is jettisonable during flight. This example further comprises a guidance and control system positioned within said lifting body. The guidance and control system controls at least one engine.

By way of example the airfoil is symmetrical. In one example the airfoil is cambered. In a particular example the cambered airfoil has a thickness ratio of 18%. In another example the cambered airfoil has a thickness ratio from 15% to 25%. In an example the airfoil is a laminar flow airfoil. In an example the airfoil is a supercritical airfoil. In an example the airfoil is a high altitude long endurance airfoil.

In an example embodiment the air launched rocket comprises a lifting body, and a plurality of rocket engines. In this example the lifting body has a cross sectional shape of an airfoil extending in a spanwise direction between the first and second wing tips. Also in this example the plurality of rocket engines is oriented for propelling the lifting body in a spanwise direction. In this example the rocket engines are liquid fueled and further comprise a plurality of fuel tanks, a plurality of oxidizer tanks and at least one cargo bay. In this example the fuel tanks, oxidizer tanks and the cargo bay are positioned within the lifting body.

In an example the cargo bay is positioned at a quarter chord point of said airfoil. In a particular example the cargo bay extends in a spanwise direction within the lifting body. In an example at least one of the fuel tanks is positioned along a trailing edge of the airfoil. In an example at least one of the oxidizer tanks is positioned along a leading edge of the airfoil. In an example embodiment the air launched rocket further comprises a first fairing covering the first wing tip. In an example the first fairing is jettisonable during flight. In an example air launched rocket further comprises a second fairing covering the second wing tip. In an example the second fairing is jettisonable during flight.

In another example the air launched rocket further comprises a guidance and control system positioned within the lifting body for controlling the rocket engines.

By way of example the airfoil is symmetrical. In another example the airfoil is cambered. In a particular example the cambered airfoil has a thickness ratio of 18%. In another example the cambered airfoil has a thickness ratio from 15% to 25%. In an example the airfoil is a laminar flow airfoil. In an example the airfoil is a supercritical airfoil. In an example the airfoil is a high altitude long endurance airfoil.

The invention further concerns a combination of a carrier aircraft and an air launched rocket. In an example combination, the air launched rocket comprises a lifting body, and at least one rocket engine. In this example the lifting body has a cross sectional shape of an airfoil extending in a spanwise direction between the first and second wing tip. In this example the rocket engine is positioned at the first wing tip and oriented for propelling the lifting body in a spanwise direction. The carrier aircraft in this example is removably attached to a suction surface of the airfoil. In a specific example the rocket engine is liquid fueled and the air launch rocket further comprises at least one fuel tank, at least one oxidizer tank and a cargo bay. In this example the fuel tank, oxidizer tank and the cargo bay are positioned within the lifting body.

In an example embodiment, of the combination, the carrier aircraft comprises first and second fuselages, a center wing section, a first wing section, a second wing section, a first empennage, and a second empennage. In this example the first and second fuselages are positioned in spaced apart relation. Each fuselage in this example is oriented to extend in a direction from a leading to trailing edge of the airfoil. The center wing section of this example extends between the first and second fuselage. In this example the first wing section extends from the first fuselage and the second wing section extends from the second fuselage. In this example the first empennage is mounted on the first fuselage and the second empennage is mounted on the second fuselage.

In an example combination the carrier aircraft further comprises at least a first jet engine and at least a second engine. In this example, the first jet engine is mounted on the first wing section outboard the lifting body and the second jet engine is mounted on the second wing section outboard the lifting body.

In an example combination the carrier aircraft further comprises at least one turbofan engine mounted on the center wing section. The turbofan engine in this example is oriented to direct air flow over the lifting body and thereby generate lift.

In an example combination the carrier aircraft further comprises a plurality of first jet engines and a plurality of second jet engines. In this example the first jet engines are mounted on the first wing section and the second jet engines are mounted on the second wing section.

In an example combination the carrier aircraft further comprises a plurality of turbofan engines mounted on the center wing section. In this example the turbofan engines are oriented to direct air flow over the lifting body and thereby generate lift.

In a particular example the combination further comprises a flight guidance and control system mounted on the carrier aircraft for control thereof.

In a further example combination of a carrier aircraft and an air launched rocket, the air launched rocket comprises a lifting body, and a plurality of rocket engines. The lifting body, by way of example, has a cross sectional shape of an airfoil that extends in a spanwise direction between the first and second wing tip. In this example the plurality of rocket engines are positioned at the first wing tip and oriented for propelling the lifting body in a spanwise direction. In this example the carrier aircraft is removably attached to a suction surface of the airfoil.

In an example the rocket engines are liquid fueled. The air launched rocket in this example further comprises a plurality of fuel tanks, a plurality of oxidizer tanks, and a cargo payload. In this example the fuel tanks, oxidizer tanks and the cargo bay are positioned within the lifting body.

In an example combination the carrier aircraft comprises a first and second fuselage, a center wing section, a first wing section, a second wing section, a first empennage and a second empennage. In this example the first and second fuselages are positioned in spaced apart relation. Each fuselage in this example is oriented to extend in a direction from a leading to a training edge of the airfoil shape. In this example the center wing section extends between the first and second fuselage. In this example the first wing section extends from the first fuselage and second wing section extends from the second fuselage. In this example the first empennage is mounted on the first fuselage and the second empennage is mounted on the second fuselage.

In a particular example combination the carrier aircraft further comprises at least a first jet engine and at least a second jet engine. In this example the first jet engine is mounted on the first wing section outboard of the lifting body and the second jet engine is mounted on the second wing section outboard of the lifting body. In another example combination the carrier aircraft further comprises at least one turbofan engine mounted on the center wing section. In this example the turbofan engine is oriented to direct air flow over the lifting body and thereby generate lift.

In another example combination the carrier aircraft further comprises a plurality of first jet engines mounted on the first wing section and a plurality of second engines mounted on the second wing section.

In an example combination the carrier aircraft further comprises a plurality of turbofan engines mounted on the center wing section. In this example the turbofan engines are oriented to direct air flow over the lifting body and thereby generate lift.

In an example the combination further comprises a flight guidance and control system mounted on the carrier aircraft for control thereof.

The invention further encompasses a method of transporting a payload into earth orbit. An example method comprises using a carrier aircraft attached to a lifting body containing the payload to fly the lifting body to an altitude above the earth, using the lifting body to generate lift while flying, detaching the lifting body from the carrier aircraft, propelling the lifting body in a spanwise direction into earth orbit using one or more rocket engines, mounted on the wing tip. The example lifting body has a cross sectional shape of an airfoil extending spanwise from a first to a second wing tip.

In a particular example, the method further comprises using a turbofan engine mounted on the aircraft to direct air flow over a suction surface of the airfoil shape to generate lift. In an example the method further comprises returning the carrier aircraft to earth for reuse.

In an example the method further comprising releasing the payload from the lifting body while in earth orbit. In an example the method further comprises returning the lifting body to earth for reuse. In an example the method also comprises gliding the lifting body in a controlled descent. In an example the method also comprises auto-rotating the lifting body in a controlled descent.

Another example includes a method of transporting a payload contained in a lifting body from an altitude above the earth into earth orbit. The lifting body, in this example, has a cross sectional shape of an airfoil extending spanwise from a first to a second wing tip. This example method comprises propelling the lifting body in a spanwise direction into earth orbit using rocket engines mounted on the first wing tip.

DETAILED DESCRIPTION

This invention concerns a combination carrier aircraft and air launched rocket, a method of transporting a payload into earth orbit.

Figure 1:
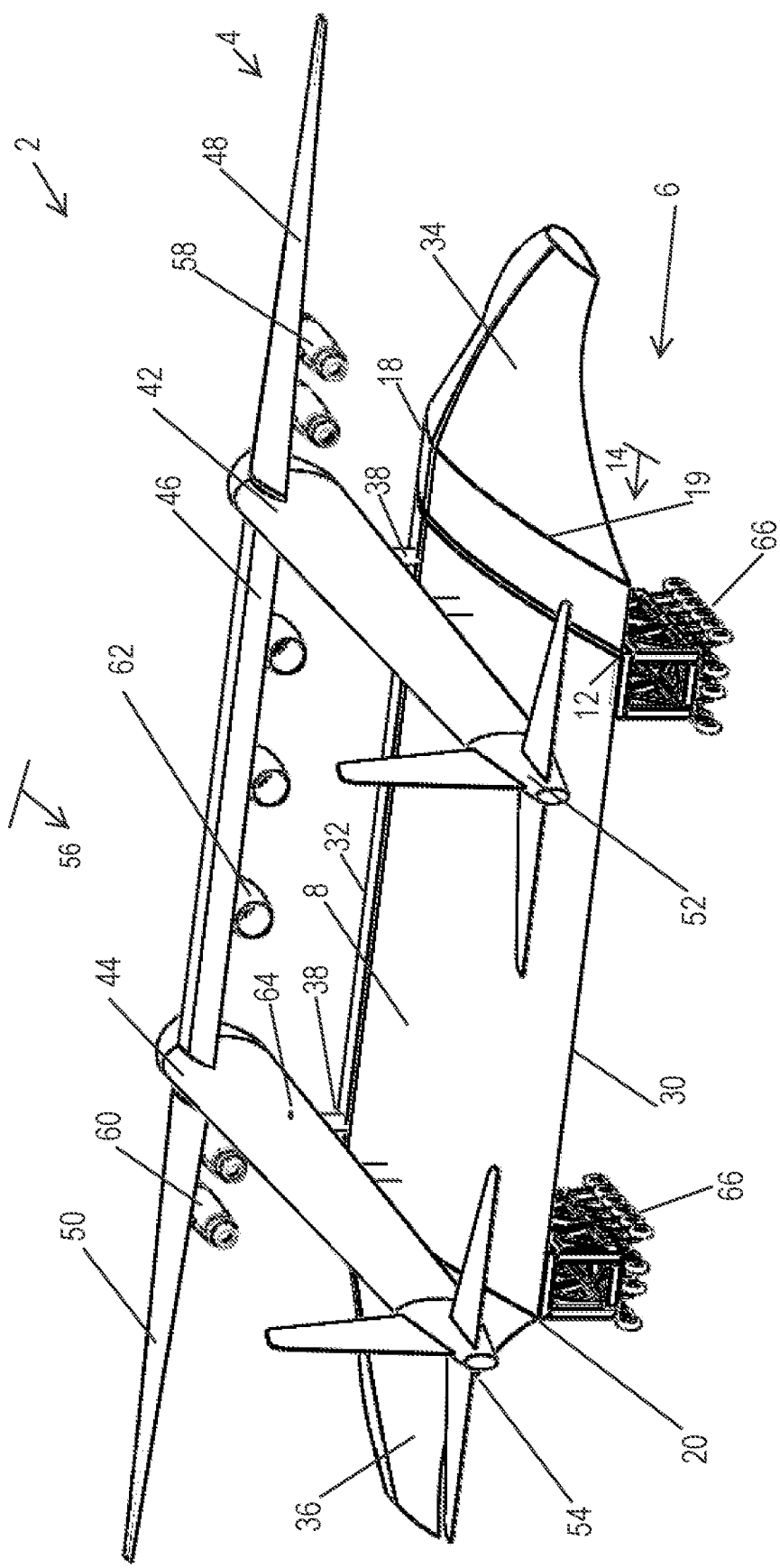
FIG. 1 is an isometric view of an example embodiment of a the carrier aircraft and air launched rocket combination according to the invention.
Figure 2:
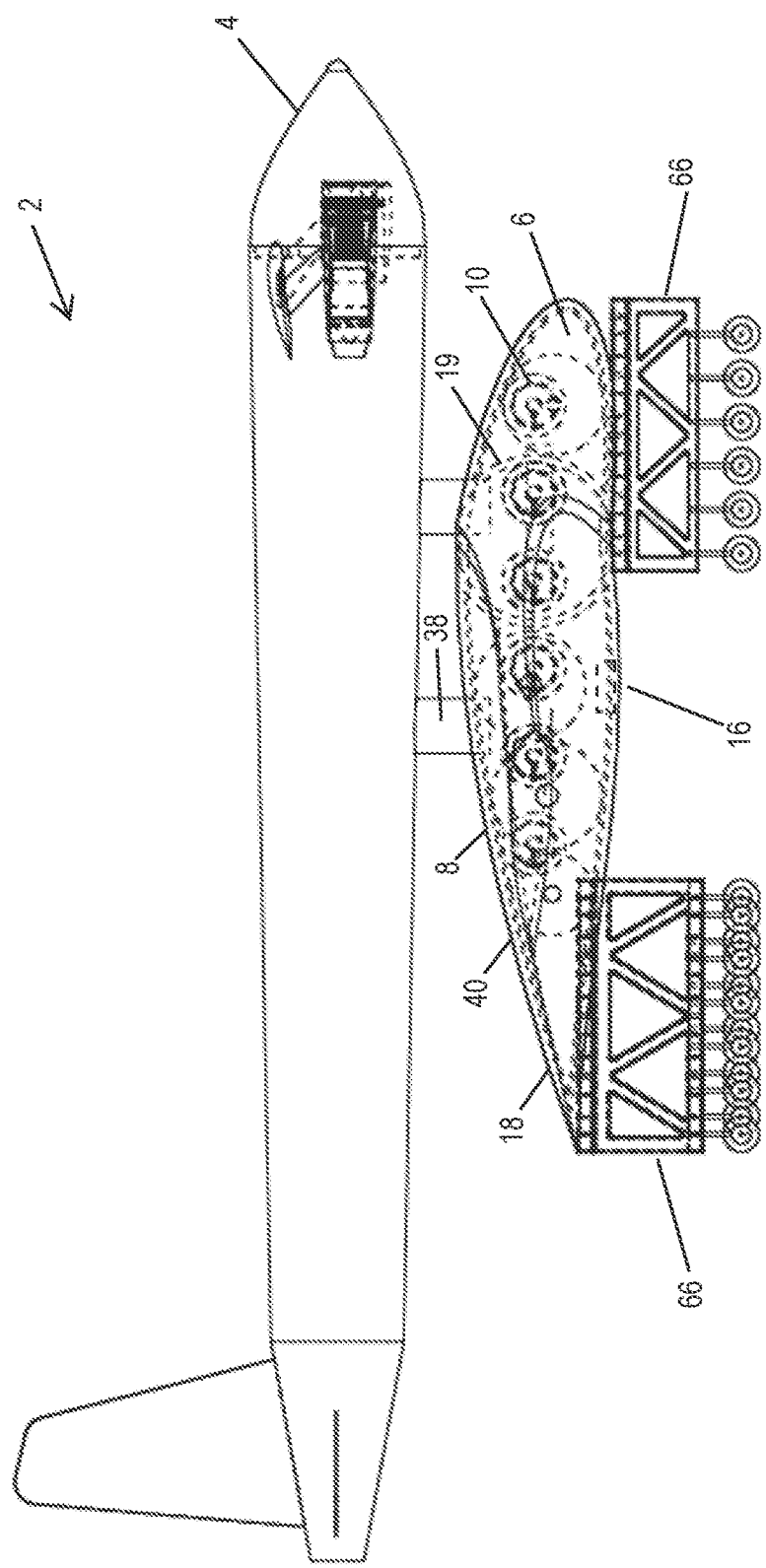
FIG. 2 is a right side view of the carrier aircraft and air launched rocket combination, shown in FIG. 1.

FIGS. 1 and 2 illustrate an example combination 2 of a carrier aircraft 4 and air launched rocket 6. The air launched rocket 6 comprises a lifting body 8 and rocket engines 10.

Although the example in FIGS. 1 and 2 illustrates many rocket engines 10, the lifting body 8 may also have one rocket engine.

Figure 3:
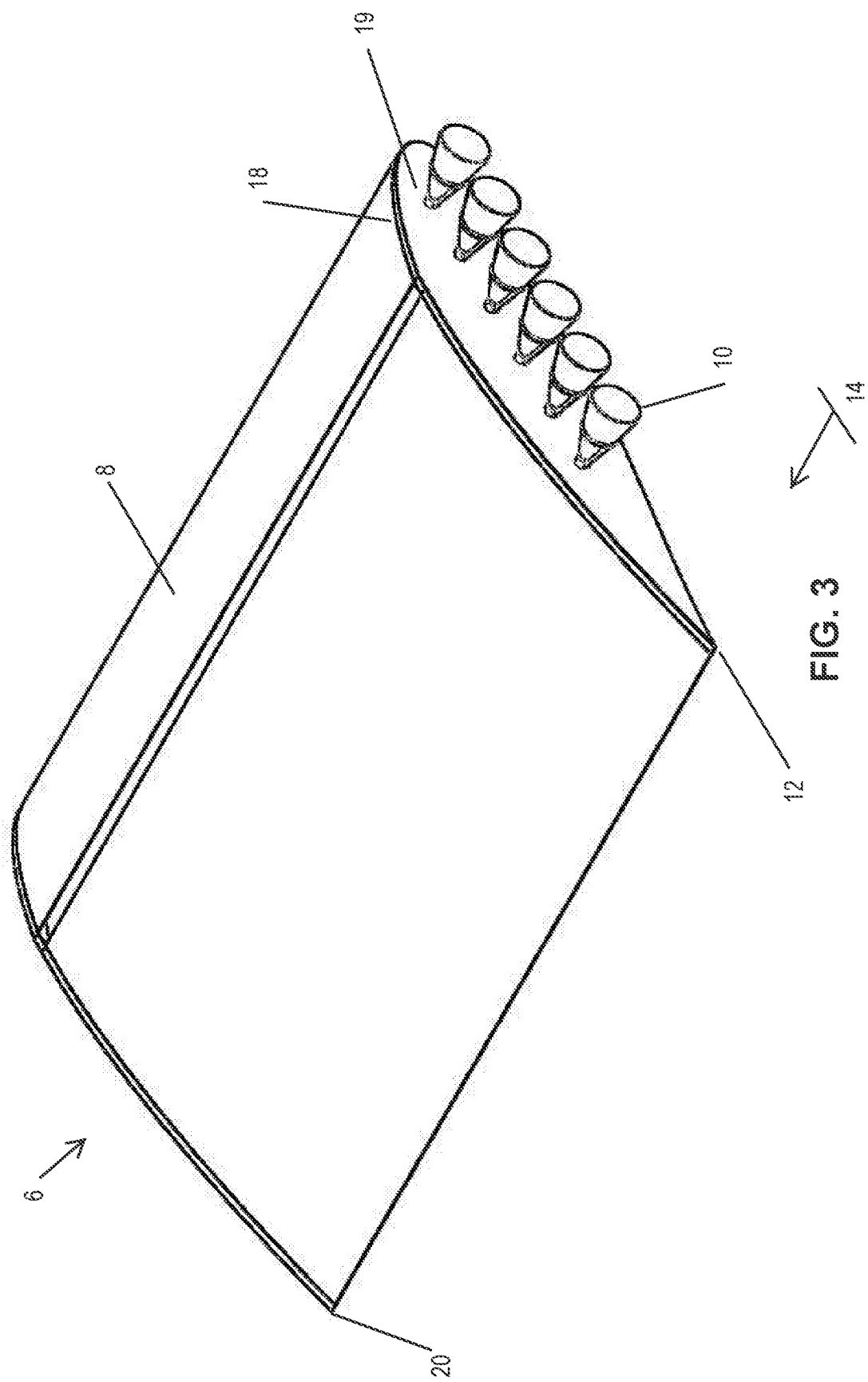
FIG. 3 is an isometric view of the air launched rocket, shown in FIG. 1.
Figure 4:
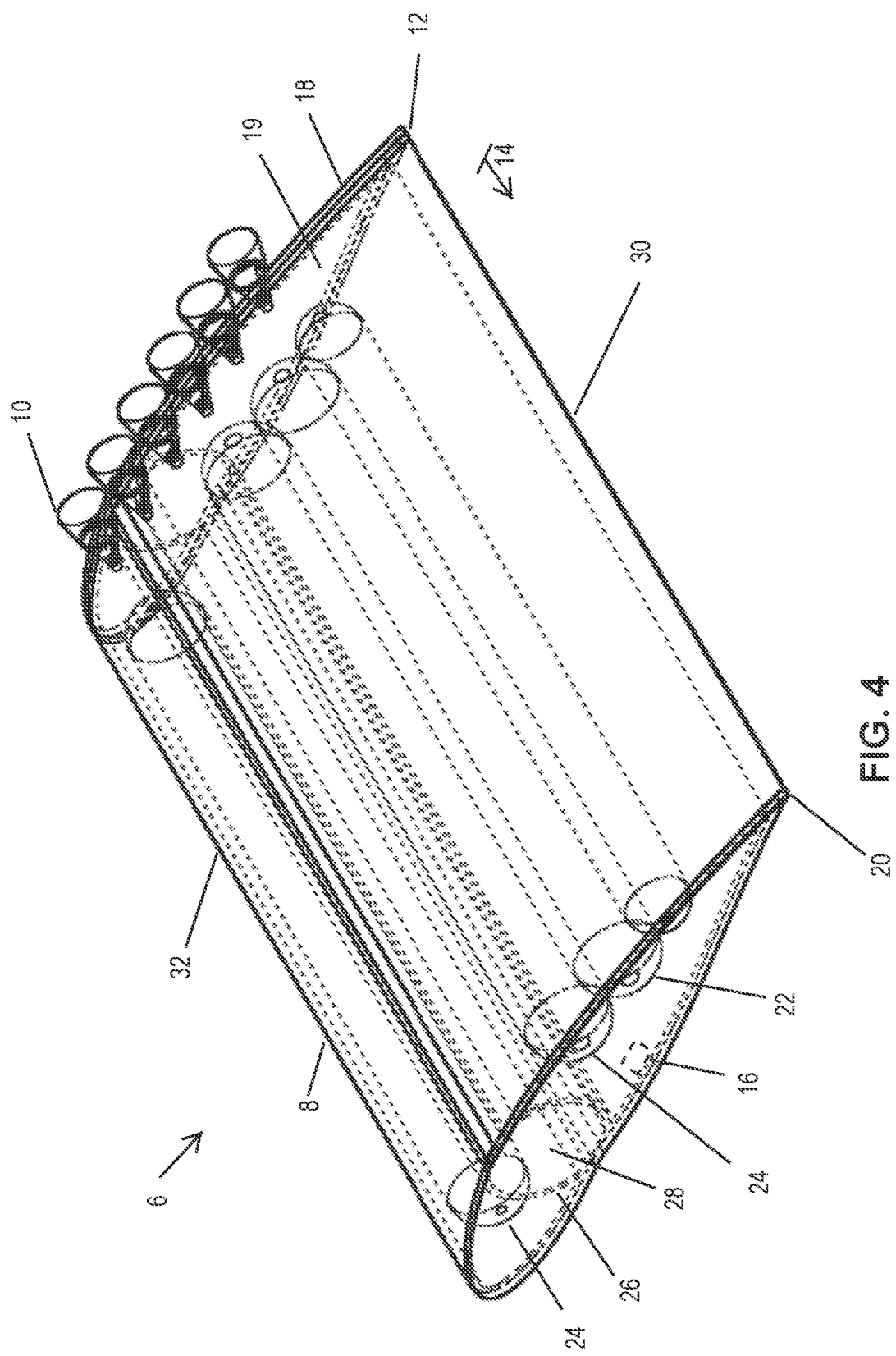
FIG. 4 is an isometric view of the air launched rocket of FIG. 1 illustrating the internal components.

FIGS. 3 and 4 illustrate an example air launched rocket 6 with the rocket engines 10 positioned at first wingtip 12 oriented for propelling the lifting body 8 in a spanwise direction 14. The rocket engines 10 are used to propel the air launched rocket 6 after jettison from the carrier aircraft 4 (see FIG. 1). At the jettison altitude of 70,000 feet, the air is so thin that aerodynamic forces are negligible and there is no need for stream lining of the air launched rocket 6. As a result steering the air launch rocket 6 may be accomplished by gimbaling the rocket engines 10. Alternatively the steering may be accomplished by reaction control thrusters. A control system may be used to control the orientation of the rocket engines 10 or the combination rocket engine and reaction control thrusters to insure the air launch rocket 6 reaches the intended destination. To accomplish this, the air launched rocket 6 comprises a guidance and control system 16 (see FIG. 2) positioned within lifting body 8 (see FIGS. 4 and 5). By way of example the guidance and control system 16 controls the rocket engines 10 or the rocket engine and reaction control thrusters.

As shown in FIGS. 2 and 3, an example lifting body 8 has a cross sectional shape 18 of an airfoil 19. Cross sectional shape 18 extends in the spanwise direction 14 between the first wingtip 12 and a second wingtip 20 (see FIG. 3). The airfoil 19 may be cambered. The cambered airfoil 19 may have a thickness ratio from about 15 to about 18 percent. More specifically the cambered airfoil 19 may have a thickness ratio of 18 percent. In other examples airfoil 19 may be symmetric, a laminar flow airfoil, a super critical airfoil, or a high altitude long endurance airfoil. A laminar flow airfoil is defined as an airfoil designed to delay the transition of top surface flow to turbulent flow. A supercritical airfoil is defined as an airfoil designed to delay the acceleration of top surface flow to Mach 1 and thereby reduce associated wave drag. A high altitude long endurance airfoil is defined as an airfoil designed to perform with maximum efficiency in low Reynolds number flight conditions.

Figure 5:
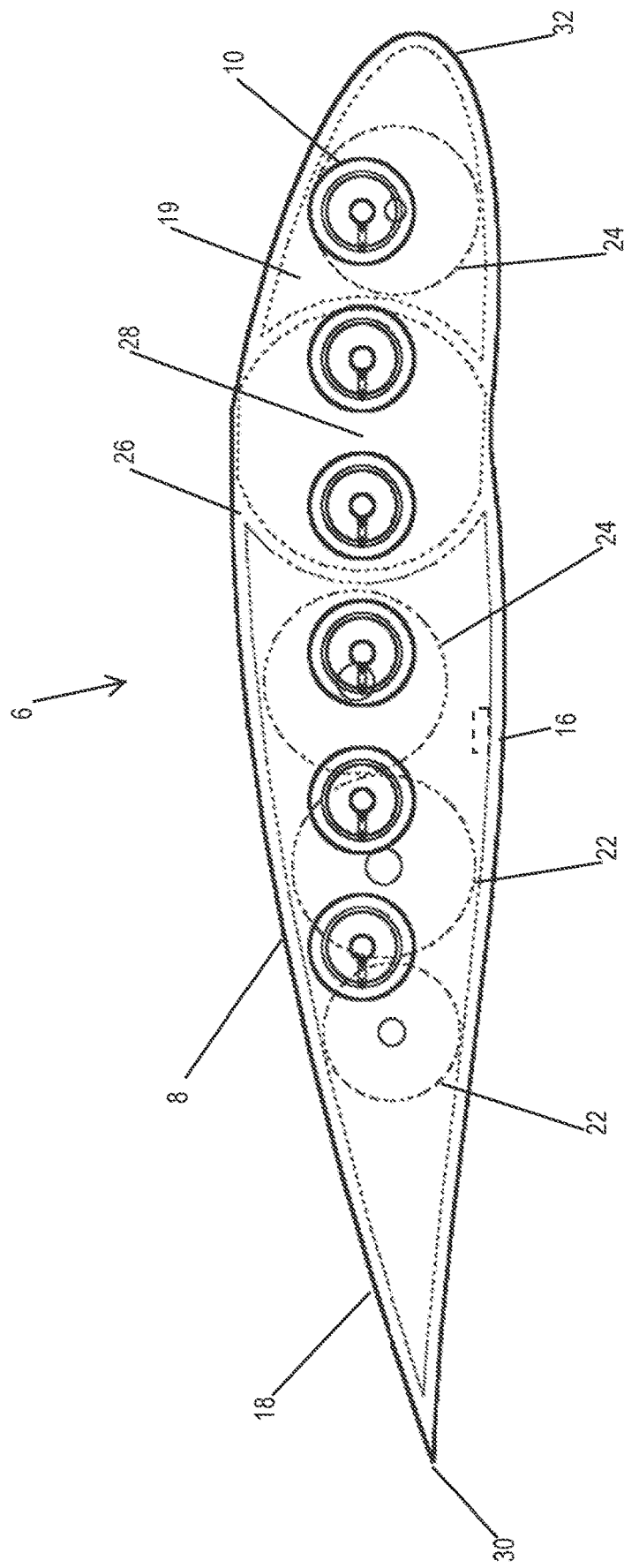
FIG. 5 is a right side cross sectional view of the air launched rocket in FIG. 1, illustrating the internal components.

In an example illustrated in FIGS. 4 and 5, the air launched rocket 6 includes rocket engines 10 which may be liquid fueled. In this example the air launched rocket 6 comprises one or more fuel tanks 22, one or more oxidizer tanks 24, and a cargo bay 26. Fuel tanks 22, oxidizer tanks 24 and cargo bay 26 are positioned within lifting body 8. In a practical embodiment, cargo bay 26 may be positioned at a quarter chord point 28 of airfoil 19 (see FIGS. 4 and 5) and extend in the spanwise direction 14 within lifting body 8 (see FIG. 4). Fuel tanks 22 may be positioned along the trailing edge 30 of airfoil 19. Oxidizer tanks 24 may be positioned along the leading edge 32 of airfoil 19.

Referring to FIG. 1, the air launched rocket 6 further comprises a first fairing 34 covering first wing tip 12 and a second fairing 36 covering second wingtip 20. The first and second fairings, 34 and 36, are jettisonable during flight as described in detail below. The fairings, 34 and 36, are present to protect the rocket engines 10 as well as to provide streamlining during the atmospheric phases of flight.

Referring to FIGS. 1 and 2, an example carrier aircraft 4 is removably attached via attachment mechanisms 38 to a suction surface 40 of the airfoil 19. The carrier aircraft 4 comprises a first fuselage 42, a second fuselage 44, a center wing section 46 extending between the first and second fuselages, 42 and 44. A first wing section 48 extends outboard of the first fuselage 42 and a second wing section 50 extends outboard of the second fuselage 44. A first empennage 52 mounts on the first fuselage 42 and a second empennage 54 mounts on the second fuselage 44. The first and second fuselages, 42 and 44, are positioned in spaced apart relation. Each fuselage is oriented to extend in a direction 56 from leading edge 32 to trailing edge 30 of airfoil 19.

Propulsion of the carrier aircraft 2 in an example, illustrated in FIG. 1, comprises one or more first jet engines 58 mounted on the first wing 48, and one or more second jet engines 60 mounted on the second wing 50. The jet engines 58 and 60 are mounted outboard of the lifting body 8. First and second jet engines 58 and 60 can be turbofans or turbojets with afterburners. In another example, carrier aircraft 2 further comprises one or more turbofan engines 62 mounted on the center wing 46 oriented in a chordwise direction 56 to direct air flow over lifting body 8 to generate lift. The turbofan engines 62 bypass and exhaust gas impinges the suction surface 40 to produce additional lift.

By example the carrier aircraft 2 may fly by remote control via a flight guidance and control system 64 (see FIG. 1) mounted on carrier aircraft 2. In still another example the carrier aircraft 2 may be piloted and controlled via the flight guidance and control system 64.

Illustrations of an example combination 2 in operation are included in FIGS. 6 through 11. Operationally an example combination 2 carrier aircraft 4 and air launched rocket 6 will taxi and roll (see FIG. 6), rotate and climb (see FIG. 7), jettison wingtips (see FIG. 8), bank and jettison air launched rocket 6 (see FIG. 9), ignite booster engines 10 (see FIG. 10), and either place the payload 26 in near earth orbit or earth orbit (see FIG. 11). If the payload 26 is placed in near earth orbit the payload 26 may have an attached kick motor to propel the payload 26 into orbit. After the payload 26 with the attached kick motor separates form the lifting body, the kick motor ignites propelling payload 26 into earth orbit.

Figure 6:
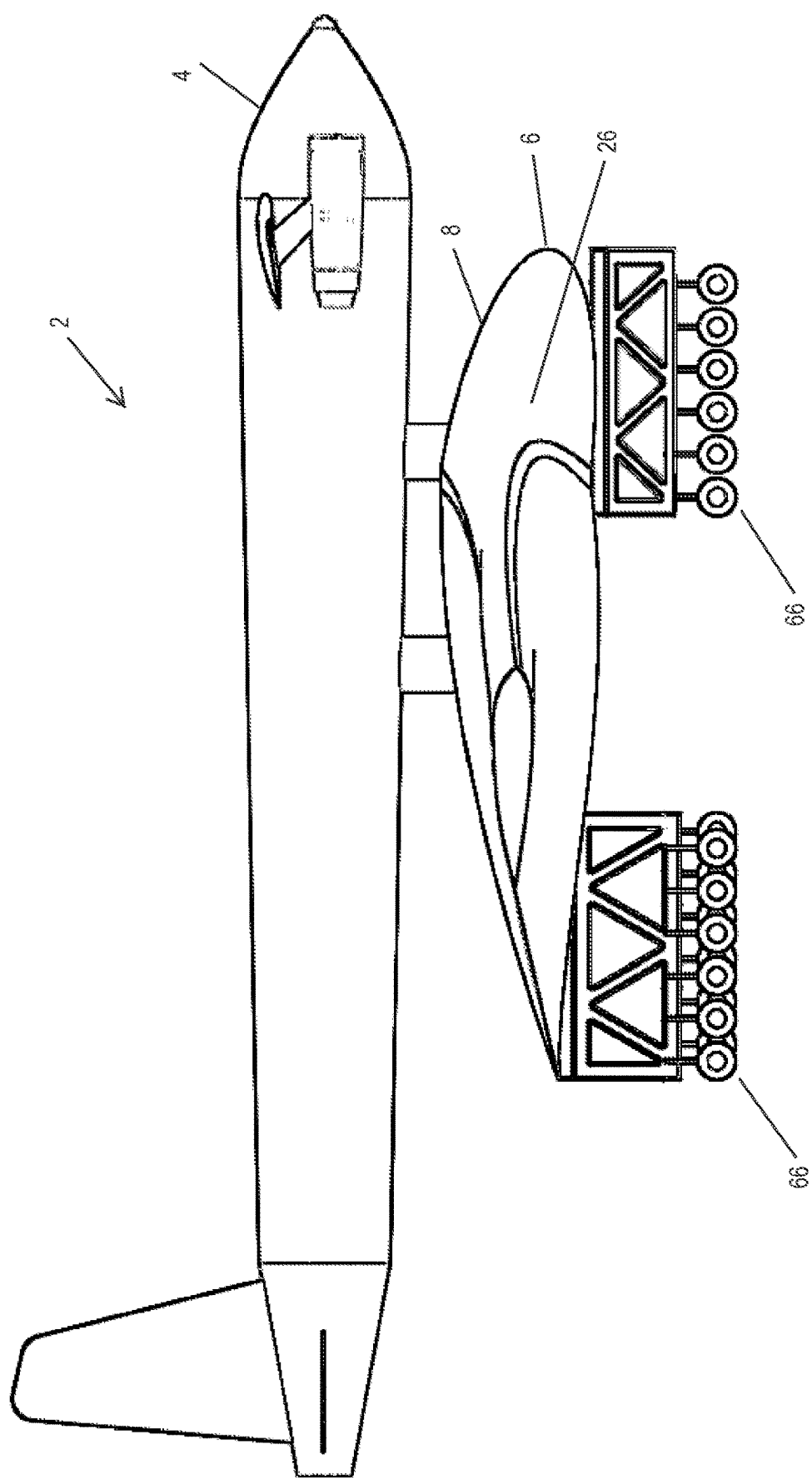
FIGS. 6-11 illustrate an example combination in use.
Figure 7:
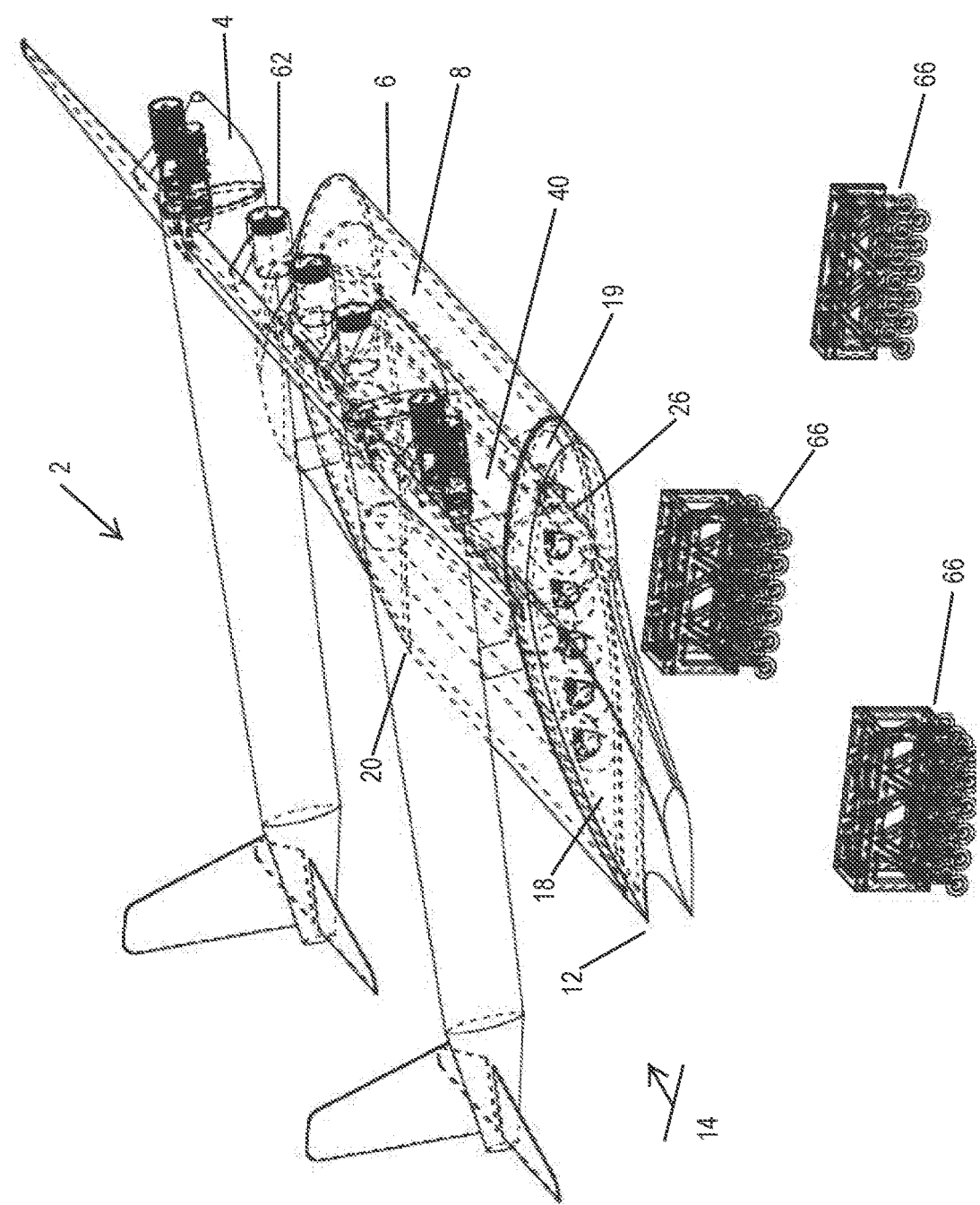
Figure 8:
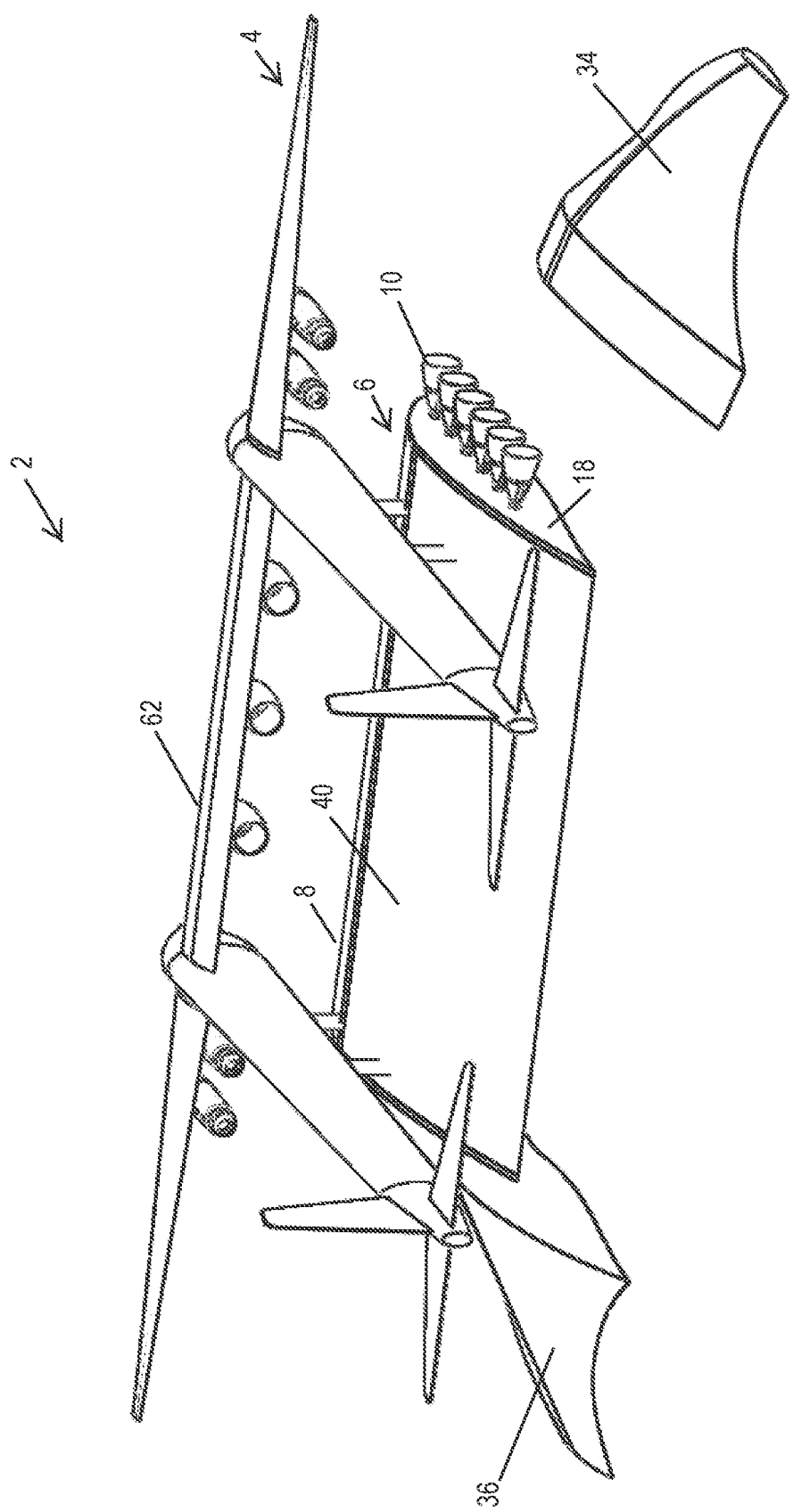
Figure 9:
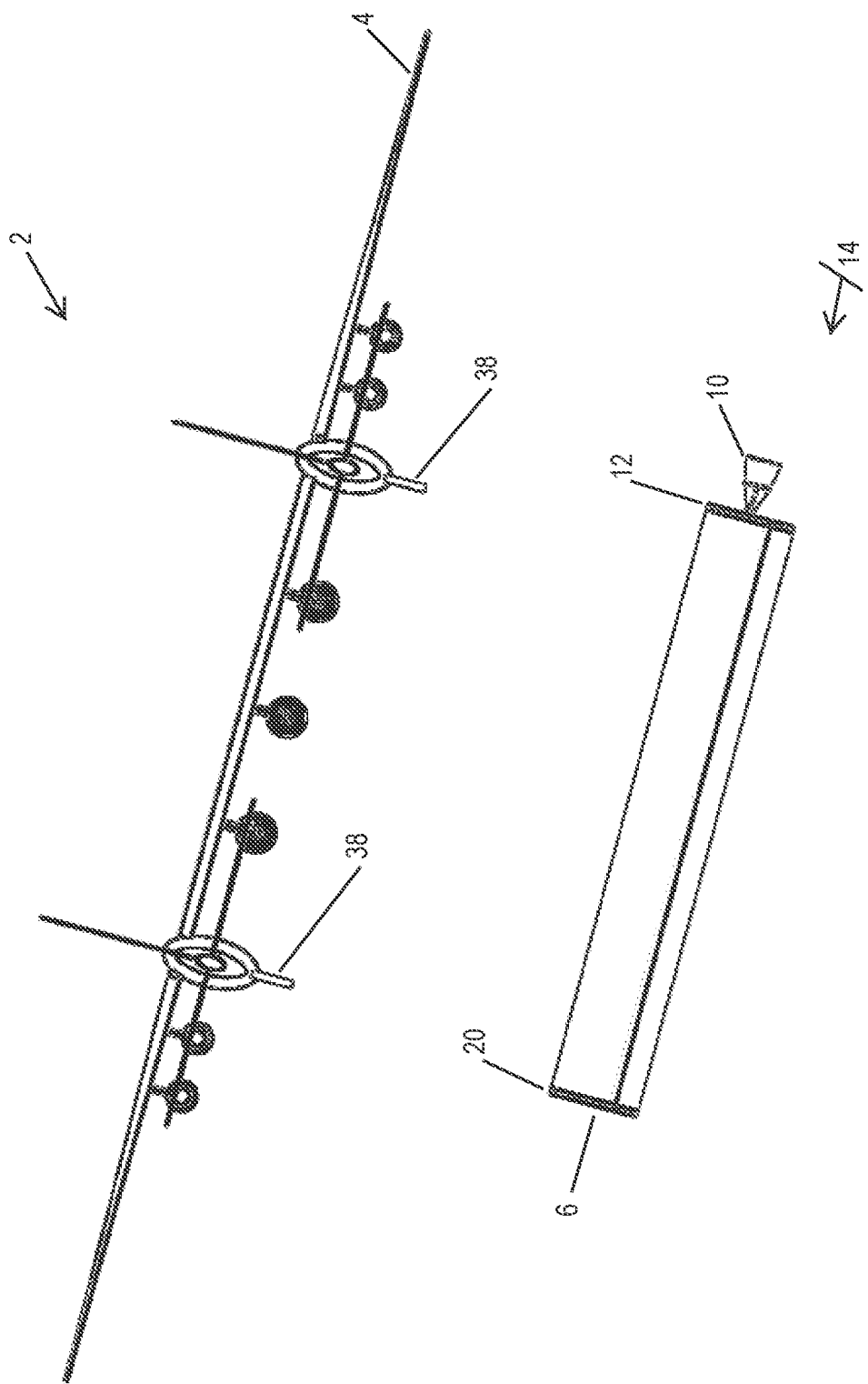
Figure 10:
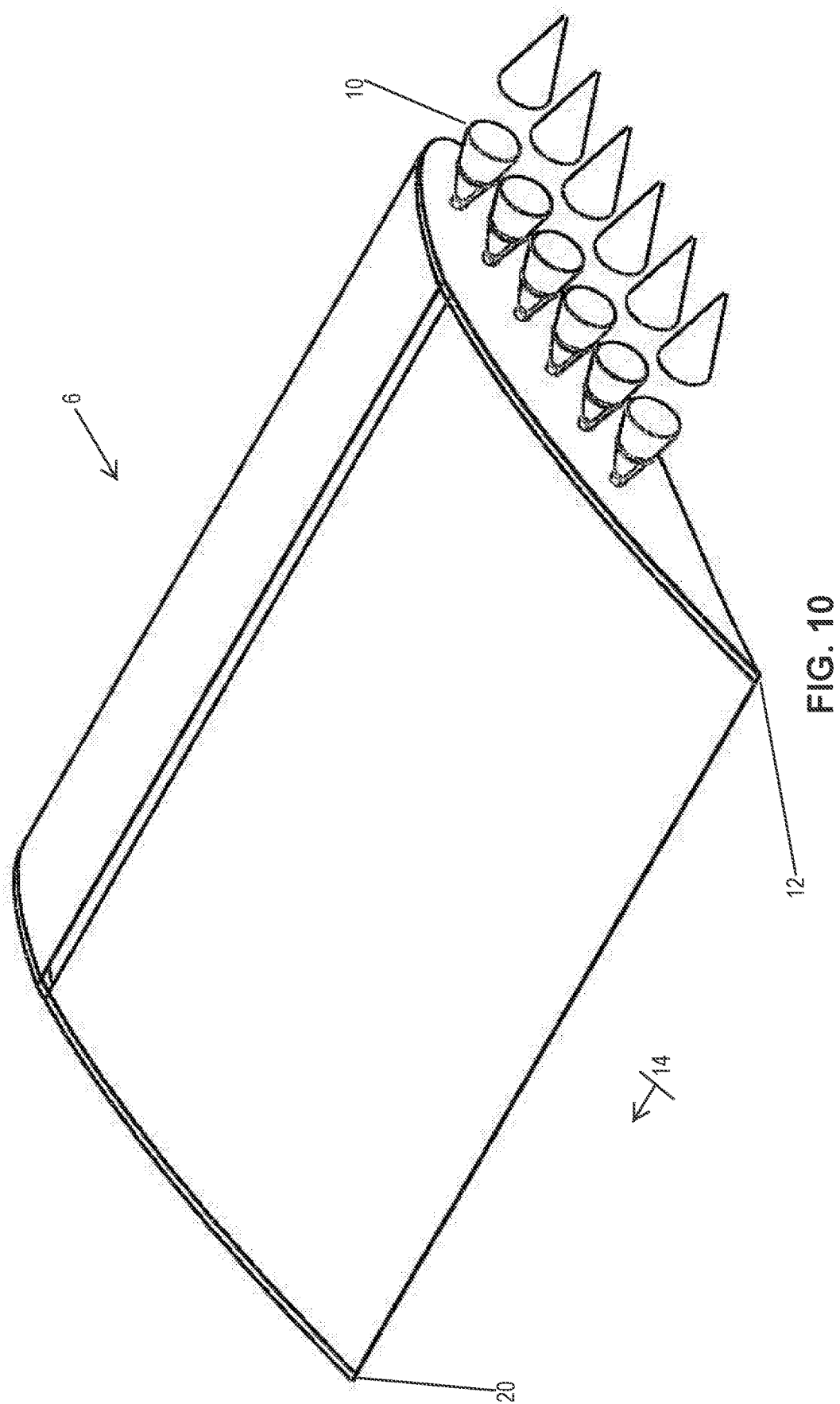
Figure 11:
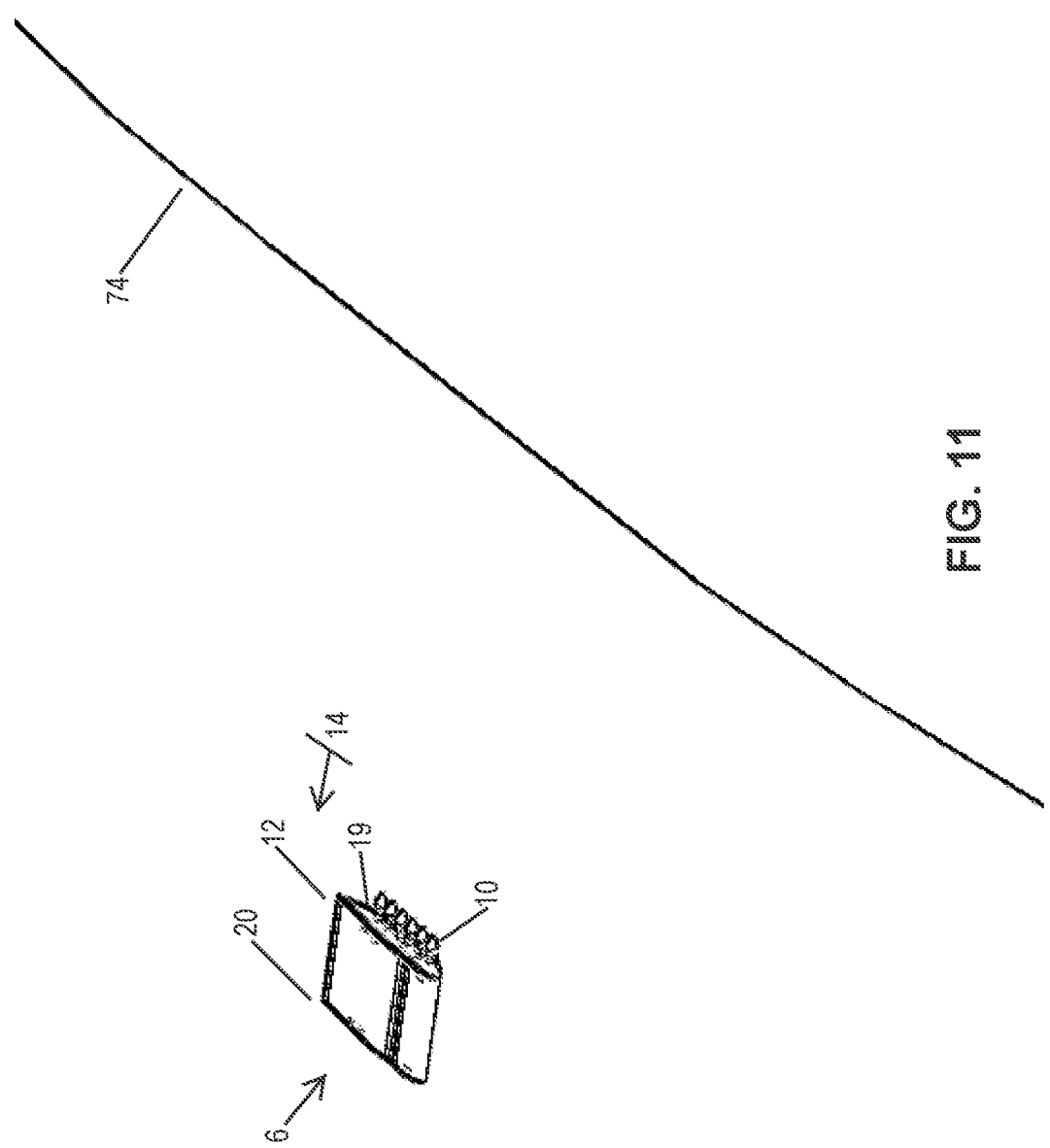

An example method of transporting the payload 26 into earth orbit comprises using the combination 2 of the carrier aircraft 4 attached to the lifting body 6 containing the payload 26 to fly the lifting body 8 to an altitude above earth, see FIG. 7. The lifting body 8 has a cross sectional shape 18 of an airfoil 19 extending spanwise direction 14 from a first to a second wing tips, 12 and 20. In the example combination 2, as illustrated in FIG. 6, is supported on dollies 66 during the taxi portion of the flight. The combination 2 will proceed down the runway and, at a sufficient speed, rotate and jettison the dollies 66 and take off, as seen in FIG. 7. Also in this example, the turbofan engine 62 mounted on the carrier aircraft 4 direct air flow over a suction surface 40 of the airfoil shape 18 to generate lift. In flight the method of transportation includes using lifting body 8 to generate lift. As illustrated in FIG. 8, once the combination 2 reaches an altitude where the aerodynamic forces are minimal, about 70,000 feet, the fairings, 34 and 36, will be jettisoned from wingtips, 12 and 20. At this altitude the wingtips 34 and 36, are no longer needed to protect the rocket engines from the aerodynamic forces. After wingtip jettison the carrier aircraft 4 will bank, as illustrated in FIG. 9, the attachment mechanisms 38 will release, and the lifting body 8 will detach from the carrier aircraft 4. The carrier aircraft 4 may return to earth for reuse. FIG. 10 illustrates that once there is sufficient separation between the carrier aircraft 4 and the air launched rocket 6, the rocket engines 10, mounted on the first wing tip 12, will ignite propelling the lifting body 8 in the spanwise direction 14. As seen in FIG. 11, with sufficient fuel and oxidizer, the rocket engines 10 will place the lifting body 8 into orbit above earth 74.

Figure 12:
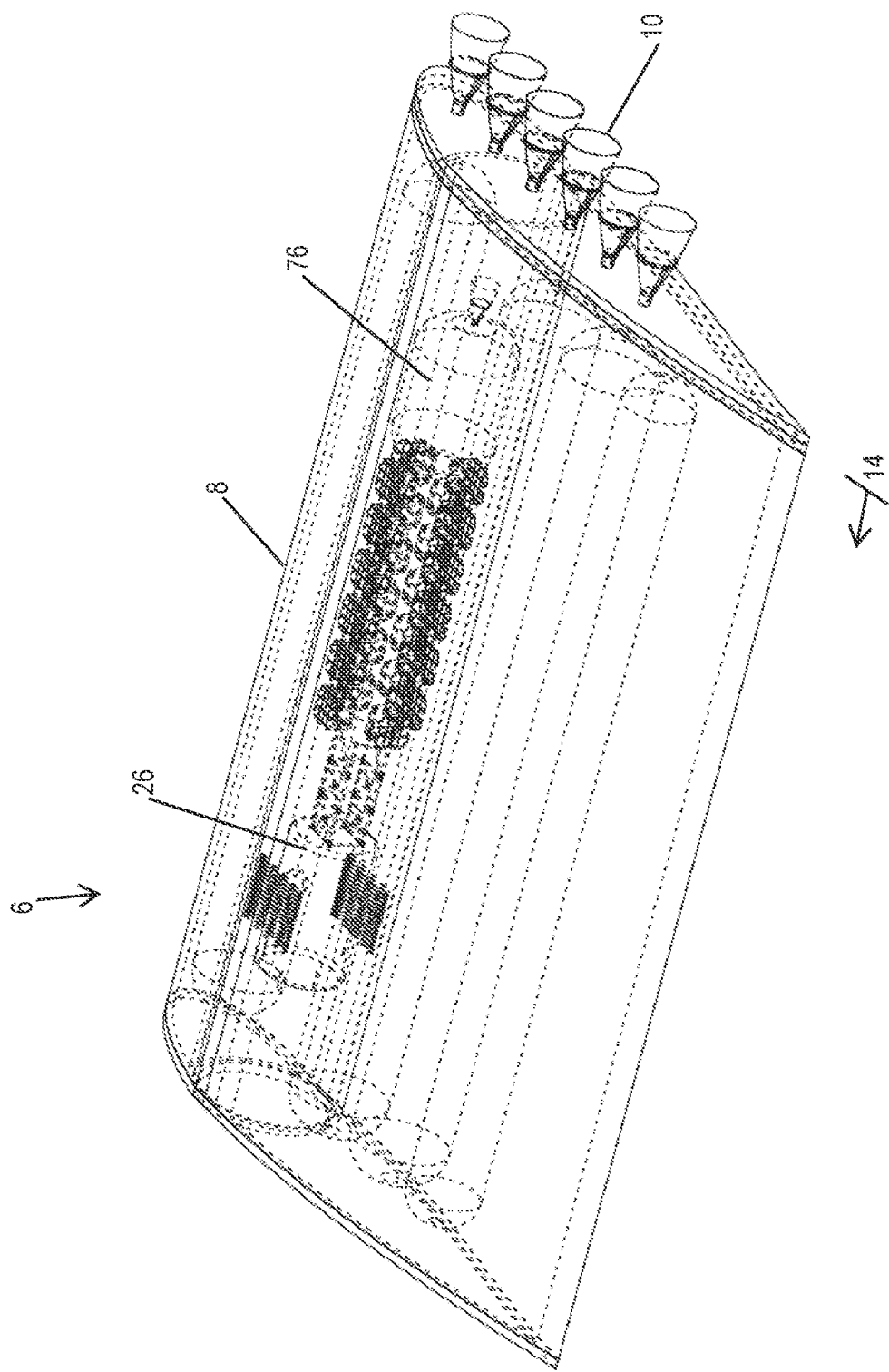
FIG. 12—Air launched rocket with example payload with kick motor.
Figure 13:
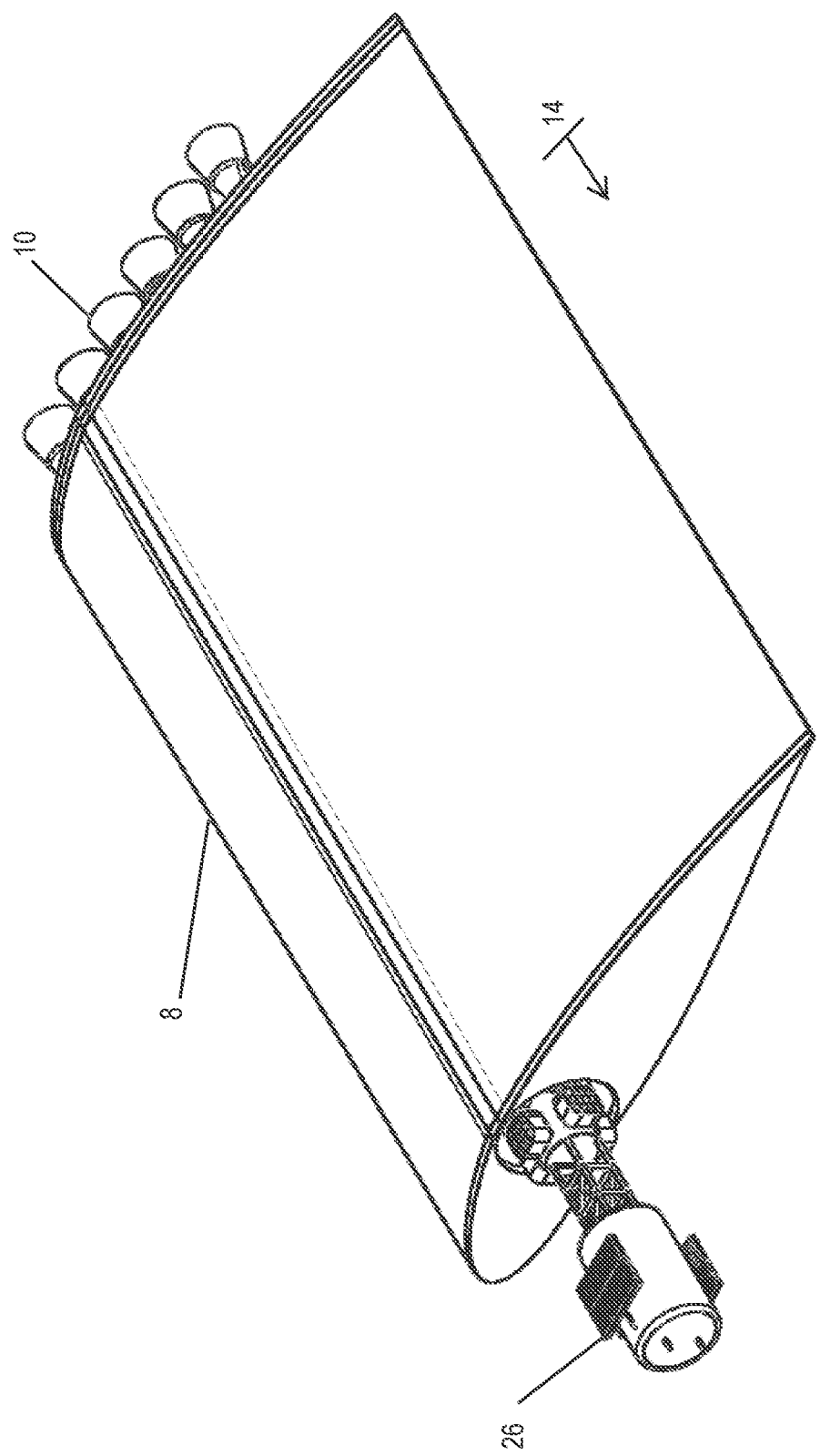
FIG. 13—Air launched rocket with example payload partially deployed.
Figure 14:
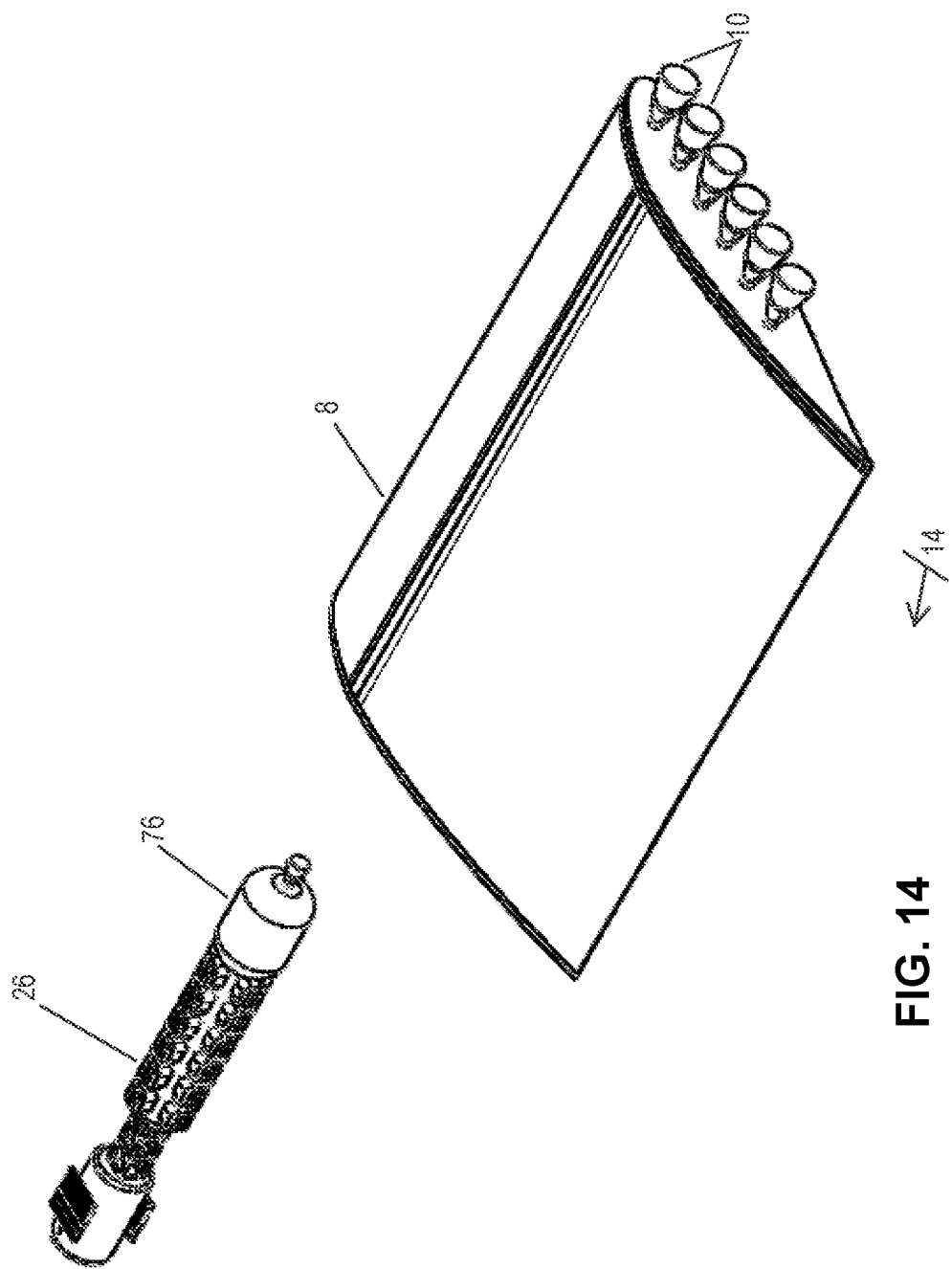
FIG. 14—Air launched rocket with example payload fully deployed.

In one example, after the carrier aircraft 4 and air launched rocket 6 separation, and after rocket engines 10 consume sufficient fuel and oxidizer to achieve orbit, the payload 26 may be released from the lifting body 8. In another example the rocket engines 10 may not be configured with sufficient fuel and oxidizer to place the air launched rocket 6 containing the payload 26 into the desired orbit, and the air launched rocket 6 may only reach a transfer orbit. In this example the payload 26 may include a kick motor 76 contained and supported within the air launched rocket 6, illustrated in FIG. 12. The kick motor 76 may be used to place the payload 26 into the final earth orbit. It is understood that the payload 26 including kick motor 76 may be mechanically constrained during flight by the appropriate structure, not shown, to prevent damage during flight, and separate and deploy by the appropriate mechanisms, not shown, contained within the lifting body 8. Once the air launched rocket 6 is at the desired altitude or orbital inclination, the mechanical constrains supporting the payload 26 will release, either by a ground command or a programmed sequence stored within the guidance and control system, and deployment mechanisms will activate to translate the payload 26 in spanwise direction 14 out of the lifting body 8. FIG. 13 illustrates the payload 26 partially exiting the lifting body 8. The payload 26 continues to translate in the spanwise direction 14 and exists the lifting body 8, illustrated in FIG. 14. Once the payload 26, including the kick motor 76, is approximately 300 yards outside of the radius of the lifting body 8 the kick motor 76 ignites propelling the payload 26 into earth orbit. The kick motor 76 separates leaving the payload in the appropriate orbit. In an example the air launched rocket 6 will return to earth in a controlled or uncontrolled manner. In another example lifting body 8 can be returned to earth for reuse by gliding or auto rotating in a controlled decent.

It is expected that a combined carrier aircraft air launched rocket combination according to the invention in which the carrier aircraft can deliver the air launched rocket to a higher altitude, where aerodynamic forces are minimized, where the rocket engine atmospheric pressure induced thrust reduction is less, and which the air launched rocket does not have the minimum cross section constraint during the flight phase, will provide improved performance.

Advantages would be realized if the carrier aircraft were capable of achieving an altitude where the aerodynamic forces are minimal, and if the air launched rocket cross section were not minimized while still providing additional lift during the flight phase. Delivery of the air launched rocket to an altitude where the aerodynamic forces are minimal is advantageous because it results in a simplified system with no need to jettison aerodynamic surfaces or fairings after separation from the carrier aircraft. There is clearly an opportunity to provide an air launched rocket which can enhance the lift of the carrier aircraft and air launched rocket combination, deliver the air launched rocket to a higher altitude than previous air launched rockets, thus eliminating the need for jettisonable aerodynamic surface during the boost phase of flight.

What is claimed is:

1. An air launched rocket, said rocket comprising:
   a lifting body having a cross sectional shape of an airfoil extending in a spanwise direction between a first and a second wing tip;
   at least one rocket engine positioned at said first wing tip, said at least one rocket engine oriented for propelling said lifting body in a spanwise direction.

2. The air launched rocket according to claim 1, wherein said at least one rocket engine is a liquid fueled engine, said air launched rocket further comprising:
   at least one fuel tank positioned within said lifting body;
   at least one oxidizer tank positioned within said lifting body;
   a cargo bay positioned within said lifting body.

3. The air launched rocket according to claim 2, wherein said cargo bay is positioned at a quarter chord point of said airfoil.

4. The air launched rocket according to claim 2, wherein said cargo bay extends in a spanwise direction within said lifting body.

5. The air launched rocket according to claim 2, wherein said at least one fuel tank is positioned along a trailing edge of said airfoil.

6. The air launched rocket according to claim 2, wherein said at least one oxidizer tank is positioned along a leading edge of said airfoil.

7. The air launched rocket according to claim 1, further comprising a first fairing covering said first wing tip, said first fairing being jettisonable during flight.

8. The air launched rocket according to claim 7, further comprising a second fairing covering said second wing tip.

9. The air launched rocket according to claim 8, wherein said second fairing is jettisonable during flight.

10. The air launched rocket according to claim 1, further comprising a guidance and control system positioned within said lifting body, said guidance and control system controlling said at least one engine.

11. The air launched rocket according to claim 1, wherein said airfoil is symmetrical.

12. The air launched rocket according to claim 1, wherein said airfoil is cambered.

13. The air launched rocket according to claim 12, wherein said cambered airfoil has a thickness ratio of 18%.

14. The air launched rocket according to claim 12, wherein said cambered airfoil has a thickness ratio from 15% to 25%.

15. The air launched rocket according to claim 1, wherein said airfoil is a laminar flow airfoil.

16. The air launched rocket according to claim 1, wherein said airfoil is a supercritical airfoil.

17. The air launched rocket according to claim 1, wherein said airfoil is a high altitude long endurance airfoil.

18. An air launched rocket, said rocket comprising:
   a lifting body having a cross sectional shape of an airfoil extending in a spanwise direction between a first and a second wing tip;
   a plurality of rocket engines positioned at said first wing tip, said rocket engines oriented for propelling said lifting body in a spanwise direction.

19. The air launched rocket according to claim 18, wherein said rocket engines are liquid fueled, said air launched rocket further comprising:
   a plurality of fuel tanks positioned within said lifting body;
   a plurality of oxidizer tanks positioned within said lifting body;
   at least one cargo bay positioned within said lifting body.

20. The air launched rocket according to claim 18, wherein said at least one cargo bay is positioned at a quarter chord point of said airfoil.

21. The air launched rocket according to claim 20, wherein said at least one cargo bay extends in a spanwise direction within said lifting body.

22. The air launched rocket according to claim 19, wherein at least one of said fuel tanks is positioned along a trailing edge of said airfoil.

23. The air launched rocket according to claim 19, wherein at least one of said oxidizer tanks is positioned along a leading edge of said airfoil.

24. The air launched rocket according to claim 18, further comprising a first fairing covering said first wing tip, said first fairing being jettisonable during flight.

25. The air launched rocket according to claim 24, further comprising a second fairing covering said second wing tip.

26. The air launched rocket according to claim 25, wherein said second fairing is jettisonable during flight.

27. The air launched rocket according to claim 18, further comprising a guidance and control system positioned within said lifting body for controlling said rocket engines.

28. The air launched rocket according to claim 18, wherein said airfoil is symmetrical.

29. The air launched rocket according to claim 18, wherein said airfoil is cambered.

30. The air launched rocket according to claim 29, wherein said cambered airfoil has a thickness ratio of 18%.

31. The air launched rocket according to claim 29, wherein said cambered airfoil has a thickness ratio from 15% to 25%.

32. The air launched rocket according to claim 18, wherein said airfoil is a laminar flow airfoil.

33. The air launched rocket according to claim 18, wherein said airfoil is a supercritical airfoil.

34. The air launched rocket according to claim 18, wherein said airfoil is a high altitude long endurance airfoil.

35. In combination, a carrier aircraft and an air launched rocket, said air launched rocket comprising:
   a lifting body having a cross sectional shape of an airfoil extending in a spanwise direction between a first and a second wing tip;
   at least one rocket engine positioned at said first wing tip, said rocket engine oriented for propelling said lifting body in a spanwise direction; wherein
   said carrier aircraft is removably attached to a suction surface of said airfoil.

36. The combination according to claim 35, wherein said at least one rocket engine is a liquid fueled engine, said air launched rocket further comprising:
   at least one fuel tank positioned within said lifting body;
   at least one oxidizer tank positioned within said lifting body;
   a cargo bay positioned within said lifting body.

37. The combination according to claim 35, wherein said carrier aircraft comprises:
   first and second fuselages positioned in spaced apart relation, each said fuselage being oriented to extend in a direction from a leading edge to a trailing edge of said airfoil;
   a center wing section extending between said first and said second fuselage;
   a first wing section extending from said first fuselage;
   a second wing section extending from said second fuselage;
   a first empennage mounted on said first fuselage;
   a second empennage mounted on said second fuselage.

38. The combination according to claim 37, wherein said carrier aircraft further comprises:
   at least a first jet engine mounted on said first wing section outboard of said lifting body;
   at least a second jet engine mounted on said second wing section outboard of said lifting body.

39. The combination according to claim 37, wherein said carrier aircraft further comprises at least one turbofan engine mounted on said center wing section, said at least one turbofan engine oriented to direct air flow over said lifting body and thereby generate lift.

40. The combination according to claim 37, wherein said carrier aircraft further comprises:
   a plurality of first jet engines mounted on said first wing section;
   a plurality of second jet engines mounted on said second wing section.

41. The combination according to claim 37, wherein said carrier aircraft further comprises a plurality of turbofan engines mounted on said center wing section, said turbofan engines being oriented to direct air flow over said lifting body and thereby generate lift.

42. The combination according to claim 35, further comprising a flight guidance and control system mounted on said carrier aircraft for control thereof.

43. In combination, a carrier aircraft and an air launched rocket, said air launched rocket comprising:
   a lifting body having a cross sectional shape of an airfoil extending in a spanwise direction between a first and a second wing tip;
   a plurality of rocket engines positioned at said first wing tip, said rocket engines oriented for propelling said lifting body in a spanwise direction; wherein
   said carrier aircraft is removably attached to a suction surface of said airfoil.

44. The combination according to claim 43, wherein said rocket engines are liquid fueled engines, said air launched rocket further comprising:
   a plurality of fuel tanks positioned within said lifting body;
   a plurality of oxidizer tanks positioned within said lifting body;
   at least one cargo bay positioned within said lifting body.

45. The combination according to claim 43, wherein said carrier aircraft comprises:
   first and second fuselages positioned in spaced apart relation, each said fuselage being oriented to extend in a direction from a leading edge to a trailing edge of said airfoil shape;
   a center wing section extending between said first and said second fuselage;
   a first wing section extending from said first fuselage;
   a second wing section extending from said second fuselage;
   a first empennage mounted on said first fuselage;
   a second empennage mounted on said second fuselage.

46. The combination according to claim 45, wherein said carrier aircraft further comprises:
   at least a first jet engine mounted on said first wing section outboard of said lifting body;
   at least a second jet engine mounted on said second wing section outboard of said lifting body.

47. The combination according to claim 45, wherein said carrier aircraft further comprises at least one turbofan engine mounted on said center wing section, said at least one turbofan engine oriented to direct air flow over said lifting body and thereby generate lift.

48. The combination according to claim 45, wherein said carrier aircraft further comprises:
   a plurality of first jet engines mounted on said first wing section;
   a plurality of second jet engines mounted on said second wing section.

49. The combination according to claim 45, wherein said carrier aircraft further comprises a plurality of turbofan engines mounted on said center wing section, said turbofan engines being oriented to direct air flow over said lifting body and thereby generate lift.

50. The combination according to claim 43, further comprising a flight guidance and control system mounted on said carrier aircraft for control thereof.

51. A method of transporting a payload into earth orbit, said method comprising:

using a carrier aircraft attached to a lifting body containing said payload to fly said lifting body to an altitude above the earth, said lifting body having a cross sectional shape of an airfoil extending spanwise from a first to a second wing tip;

using said lifting body to generate lift while flying;

detaching said lifting body from said carrier aircraft;

propelling said lifting body in a spanwise direction into earth orbit using one or more rocket engines mounted on said first wing tip.

52. The method according to claim 51, further comprising using a turbofan engine mounted on said aircraft to direct air flow over a suction surface of said airfoil shape to generate lift.

53. The method according to claim 51, further comprising returning said carrier aircraft to earth for reuse.

54. The method according to claim 51, further comprising releasing said payload from said lifting body while in earth orbit.

55. The method according to claim 54, further comprising returning said lifting body to earth for reuse.

56. The method according to claim 55, comprising gliding said lifting body in a controlled descent.

57. The method according to claim 55, comprising auto-rotating said lifting body in a controlled descent.

58. A method of transporting a payload contained in a lifting body from an altitude above the earth into earth orbit, said lifting body having a cross sectional shape of an airfoil extending spanwise from a first to a second wing tip, said method comprising propelling said lifting body in a spanwise direction into earth orbit using rocket engines mounted on said first wing tip.

* * * * *